G. J. DICKSON.
PHOTOGRAPHIC CAMERA SHUTTER.
APPLICATION FILED AUG. 10, 1911.
1,047,508.  Patented Dec. 17, 1912.
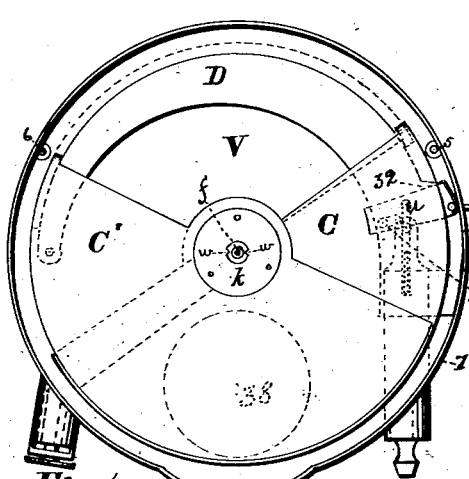
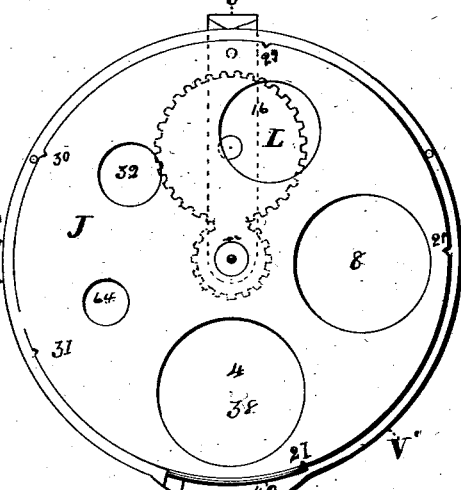
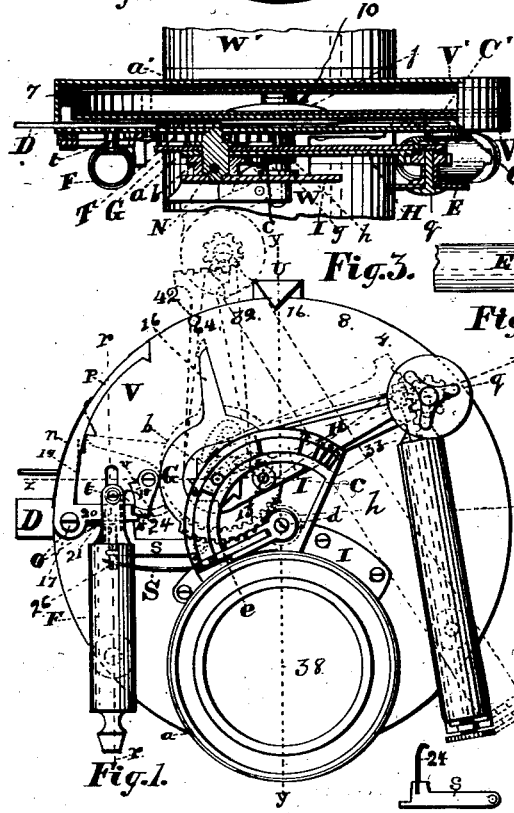
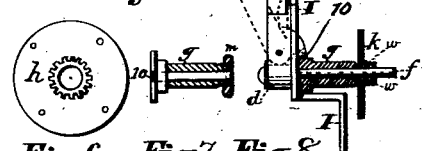
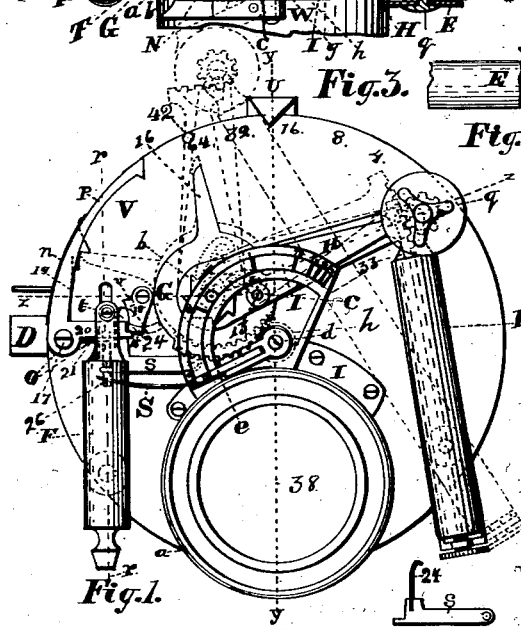
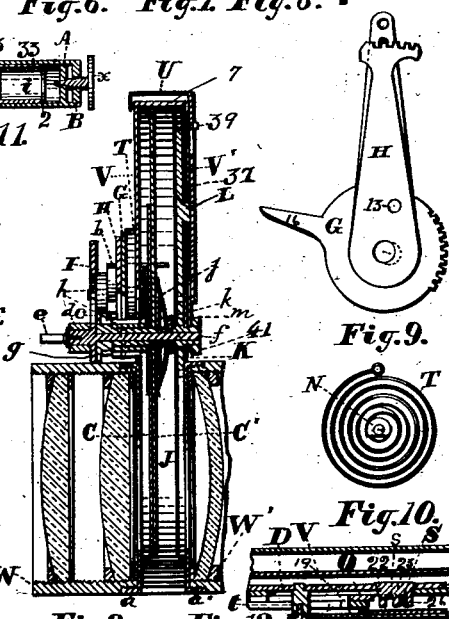
WITNESSES:  INVENTOR.
Gilbert J. Dickson

UNITED STATES PATENT OFFICE.

GILBERT J. DICKSON, OF ALBANY, NEW YORK.

PHOTOGRAPHIC-CAMERA SHUTTER.

1,047,508.   Specification of Letters Patent.   Patented Dec. 17, 1912.

Application filed August 10, 1911. Serial No. 643,334.

*To all whom it may concern:*

Be it known that I, GILBERT J. DICKSON, a citizen of the United States, and a resident of Albany, in the county of Albany and State of New York, have invented certain new and useful Improvements in Photographic-Camera Shutters, of which the following is a specification.

This invention in its present form, relates more particularly to photographic shutters between the lenses, but may be adapted to any position of the shutter.

The objects of my invention are to produce a photographic shutter, 1st, that will give equal exposure to all parts of the sensitive film; 2nd, that will always give the exposure for which it is set, and not be materially affected by dust or dampness; 3rd, in which the exposures are made midway between the release and stopping of the shutter which makes a revolution at each exposure, and, 4th, in which the length of the several exposures is obtained by a subdivision of the longest exposure opening the shutter will make which takes one second of time to pass the lens opening with the slowest regulated speed, which may be verified by comparison with one second of time and regulated by the exhaust valve, and in which the closing follows the opening of the shutter in the same direction.

My invention consists of a rotary shutter composed of disks having an open space on cne side of the center bearing of each disk and mounted on separate arbors one within the other. The inner arbor is connected with a lever arm having a coupling device, whereby the open spaces between the shutter disks may be relatively adjusted for the several exposures from the front of the outer case. The outer arbor is geared to a spring actuated operating arm having an ungearing and gearing lever and provided with detents and release catches and a stop lock for time and instantaneous exposures and connected with the plunger of a speed governor, having an adjustable exhaust valve for regulating the speed of said operating arm.

This invention further consists in certain novel details of construction and combination of parts herein shown and described.

In the drawings which constitute part of this specification, Figure 1 is a front elevation of my improved photographic shutter, showing different positions of the several parts in process of operation and indicating the length of the exposures and size of the diaphragm stops on the outer case. Fig. 2 is a vertical section of Fig. 1, taken on the line Y Y. Fig. 3 is a section of Fig. 1, taken on the line Z Z more clearly showing the main spring and bearings of the operating arm. Fig. 4 is a reverse or inside elevation of Fig. 1, showing the shutter disks covering the lens opening. Fig. 5 is an inside elevation of the back, showing the diaphragm or stop disk. Fig. 6 is a detached face view of the operating pinion and flange to which one of the shutter disks is fastened. Fig. 7 is a detached view of the hollow arbor partly in section to which one of the disks is attached. Fig. 8 is a detached part sectional view of a bracket carrying the center stud pin upon which the shutter mechanism rotates. Fig. 9 is a detached view of the operating arm and its gearing and ungearing lever. Fig. 10 is a detached view of the main spring and hub of the operating arm. Fig. 11 is a partial sectional view of the lower end of the speed governor. Fig. 12 is a partial section of Fig. 1, taken on the line *r r*.

Similar letters and figures of reference indicate corresponding parts throughout the several views.

The outer case is made in two parts, the front part V has formed around its border the rim 7 having lugs 4, 5 and 6, on the inside of said rim as shown in Fig. 4. The back part V' of the case as shown in Fig. 5, may be attached by screws to said lugs of part V. The case has lens cell openings 38 in the front and back opposite each other and to one side of the center of said case. Said openings are surrounded by the rims *a* and *a'* forming sockets into which the lens cells W and W' are screwed as shown in Figs. 1, 2 and 3. The case shell V has secured to it the bracket I, having rigidly fastened to its center the stud pin *f* which extends through an opening in the center of said case shell V as shown in Fig. 2. The center stud pin *f* carries the combined, flanged hollow arbor and pinion *h* and the hollow arbor *g*, to which the shutter disks C and C' are attached as shown in Figs. 2 and 3. The shutter disk C is secured to the flange of the combined arbor and pinion *h*. The hollow arbor *g* is fitted to turn in the arbor *h* and carries on its inner end the shutter disk C' which is prevented from turning thereon by the plate *k* having inwardly projecting V shaped teeth *w* and *w'* which fit into corresponding grooves formed in the threaded end of the arbor g as shown in Fig. 4. The plate k is riveted to the shutter disk C' and held on the arbor g against the shutter disk C by the screw nut m and spring washer j and may be tightened to the desired pressure against the shutter disk C holding the two shutter disks together as one for operation, while permitting them to be turned on each other to adjust the exposure opening between said disks by the lever e having its hub d fitted to turn on the outer end of the center stud pin f as shown in Figs. 1 and 2. When said lever e is pressed down as shown in full lines in Fig. 8, it engages the notch 10 in the flange of the hollow arbor g to which the shutter disk C' is fastened, and by swinging the lever e to the right or left the shutter disks are opened or closed and when said lever is released it is raised by the spring 9 to the position shown by dotted lines in Fig. 8 disengaging said arbor and leaving the shutter free to be operated. The operating arm G and its ungearing and gearing lever H are pivoted together on the stud pin 13 rigidly fastened in the arm G as shown in Figs. 1 and 9. The hub N is reduced at its ends and journaled in the case V and bracket I as shown in Fig. 3, and carries the main spring T attached to its inner end and case V and the operating arm G and its lever H, and ratchet b secured to said hub by a pin and engaged by the pawl c on stud pin 13, whereby the tension of spring T is regulated as shown in Figs. 1 and 3.

The pivot hole in the arm G being elongated and that in the lever H fitting the hub N closely, by rocking said lever H on the stud pin 13, by turning the combined pinion and thumb-wheel q " carried on the traveling end of the operating arm G " to the right, the pivot end of said arm is moved the length of the elongation of its pivot hole, which will ungear said arm G from pinion h of the shutter as shown in Fig. 1 by dotted lines. The traveling end of the operating arm G is pivoted to the plunger 33 of the speed governor E, and carries the aforesaid combined thumb-wheel and pinion q secured to said arm G by a spring washer friction bearing to prevent it from being turned by any strain on the lever H to which it is geared as shown by full and dotted lines in Figs. 1 and 3. The operating arm G is also provided with the arm 16, which engages the detents and releasing spring catches o and p pivoted to the case V on the stud screw 17. The catch p is longer than said catch o, (see Fig. 1) and acted upon by the springs n and 19 and stop lock 18 in such a manner that said catches may be operated together or separately for time or instantaneous exposures or focusing, as will hereinafter be described.

The spring n is fastened to the case V by rivets and acts on the back of both catches o and p. The spring 19 is secured to catch o and acts on the front of catch p causing catch p to operate with catch o when not locked by the stop 18. The arm 20 of catch p and the arm 21 of catch o extend over the stud pin 22 of the releasing lever D as shown by full and dotted lines in Figs. 1 and 12. The arm 21 of catch o being nearer the stud pin 22 of the releasing lever D then arm 20 of catch p is first released from the arm 16 of the operating arm G when the releasing lever D is operated. The stop lock 18 is secured to the case V by a friction bearing so that it will remain in any position in which it is placed until forced to another. Said stop is provided with the handle 15 whereby it may be swung in or out of contact with the arm 20 of catch p as shown by full and dotted lines in Fig. 1.

The arm s carrying the spring catch 24 as shown more clearly in detached view, is pivoted to the case V, its traveling end resting between the stud pins 22 and 25 in the releasing lever D by which it is operated at the same time as catches o and p. When catch p is locked by the stop 18 as shown by full lines in Fig. 1, and the operating arm G in the position shown by dotted lines in said figure, and the releasing lever D operated, the arm 16 of the operating arm G will first be released from catch o and pass to catch p which being locked by stop 18 holds said operating arm, leaving the shutter open for time exposures or focusing. The arm s as before mentioned carries the spring catch 24 and operated at the same time as catch o, the hook shaped end of said spring passing up over the shoulder v of the stop 18, the spring giving to the form of the stop without unlocking it. When the releasing lever D is returned to its former position it carries the arm s with it and the hook or catch on the end of said spring engages the shoulder v of the stop 18, removing said stop off the arm 20 of catch p, leaving it free to be released from arm 16 by the next releasing movement of the lever D as shown by dotted lines in Fig. 1. The spring S which holds the lever D in a set position is fastened to the case V and bears on the stud pin 26 of the lever D, (see Figs. 1 and 12).

The pneumatic pump F as shown in Figs. 1 and 12, is pivoted to the case V at its lower end and the stud pin t secured in lever D at its upper end and operated by pneumatic action. The releasing lever w is pivoted to the inside of the case V close to the rim 7 thereof, its hoe shaped inward projecting edge 32 resting upon the outer edge of the shutter disks and operated by the releasing lever D by the stud pin 34 fastened in the lever u working in a slot formed in the lever D as shown by full and dotted lines in Fig. 4. The speed governor E as shown in Fig. 11, consists of an inner and outer tube fitted to move closely and freely one within the other. The outer tube or cylinder is pivoted to the case V at or near its lower end so as to oscillate and conform to the movement of the operating arm G by which it is operated and provided with the adjustable valve $x$ supported on the bracket B secured to the said cylinder. The inner tube or plunger 33 is pivoted to the traveling end of the operating arm G as shown by full and dotted lines in Fig. 1, and divided by the partition 3 forming the countersink or cup $i$ on its inner end, the rim of which is made thin and sharpened to a knife edge at 2 to avoid an angle at that point by the plunger and cylinder, thereby preventing the compressed air from readily escaping between the said plunger and cylinder. The exhaust being mainly through the valve $x$ may be regulated by closing or opening said valve.

I am aware that compressed air has been used to regulate the length of exposures in photographic shutters, but not in the manner in which I am using it. Heretofore the length of the exposures was governed by the length of the movement of the piston within the compressed air cylinder, that is, the shutter after being opened was held until the air that had been drawn or forced into the cylinder under the piston by the releasing action of the shutter was forced out again by gravity or otherwise by the piston the release being usually by pneumatic action with a collapsible bulb by hand pressure. If the pressure is quick and strong the piston will be raised to its limit, and the air compressed. Whereas if the pressure of the bulb is weak and slow the piston may not reach its limit and may return much faster than where the air was more strongly compressed. Therefore, the length of the exposure depends as much on the amount of air drawn or forced into the cylinder as the length of the movement of the piston. In my improved shutter I do not regulate the length of the exposure by the length of the movement of the piston or plunger only the speed of the shutter mechanism which can be tested at any time by comparison with one second of time and the speed regulated accordingly by the adjustable valve $x$. The length of the several exposures are obtained by a subdivision of the longest exposure opening the shutter will make with the slowest regulated speed of the shutter mechanism which passes the lens opening in one second of time, it being only necessary to use two speeds of the shutter mechanism to give exposures from one second of time to one one thousandth of a second of time, the one a closed regulated exhaust, the other an open exhaust. Various speeds may be obtained also by shifting the pivot of the plunger on the operating arm.

Furthermore the operating arm after it is released travels nearly one fourth of its movement, compressing the air in the cylinder before the shutter opens, so that its movement afterward is regular. And the long and quick movement of the plunger gives greater compression to the air, permitting the use of a strong main spring action that will not be materially affected by dust or dampness. I do not force air into the cylinder by pneumatic action of a collapsible bulb, only the natural suction of the plunger as the operating arm is moved to a set position as shown by dotted lines in Fig. 1.

The shutter disks C and C' as shown in Figs. 2 and 4 may be made of any suitable material. Each disk is cut away on one side of its center bearing, and overlap each other as shown in Fig. 4. The shutter disks as before mentioned are mounted on separate arbors one within the other. The combined arbor and pinion $h$ carrying the shutter disk C being geared to the operating arm G is in a locked position until operated, thereby permitting shutter disk C' to be turned on disk C to adjust the exposure openings between said shutter disks, from nearly one half their circumference to a closed position without disturbing disk C, by the lever arm $e$ from the front of the outer case as hereinafter explained. When said shutter disks are at rest they cover the lens as shown in Fig. 4.

The diaphragm or stop disk J, as shown in Fig. 5, is made of thin metal and provided with the regular stop openings around its center bearing, and secured to the pinion K the hub of which passes through back V' of the case and secured thereto by the nut 41, as shown in Fig. 2. The pinion K is geared to the gear wheel L, the hub of which also passes through the case V'* and riveted in the crank arm 37, and operated by the stud pin 39 fastened in said crank working in a slot formed in the lever U pivoted on the hub of pinion K and held thereon by the said nut 41 (see Fig. 2). Said lever U extends up the back of the case and over to the front where the several stops are indicated as shown in Fig. 1. The stop disk is provided with V shaped notches on its periphery near each stop opening corresponding to the stops into which the hoe shaped end of the spring 40 drops when said stop disk is turned to the desired stop, thereby insuring the correct registering of said stop with the lens opening.

The operation is as follows: The operating arm G of the shutter mechanism being in a closed position as shown by full and dotted lines in Fig. 1, the combined thumbwheel and pinion $q$ is turned to the right swinging the lever H on the stud pin 13 in the operating arm G into the position shown by dotted lines, raising the pivot end of the operating arm G out of gear with the pinion on the arbor h of the shutter as shown by dotted lines in Fig. 1. The shutter disks in this ungeared position are held by the lever u connected with the releasing lever D acting on the periphery of said disks. The operating arm G and the ungearing lever H are then moved to a set position against the pin 42 in the case V, bringing the arm 16 of the operating arm G under the spring catch o, drawing the speed governor E to its full length and by turning the thumbwheel q to the left arm G is thrown in gear with the shutter pinion again, which is the set position for the arm G ready to make an exposure by raising the release lever D either by finger or pneumatic action. In order to make a time exposure or focus, the operating arm G is moved to a set position as in instantaneous exposures. The stop 18 is then moved into the position shown by full lines in Fig. 1, locking the catch p so that it cannot be released by the first releasing movement of the lever D but permits the catch o to be released, allowing the arm 16 of the operating arm G to pass to catch p where it will stop, leaving the shutter open either for time exposure or focusing. The arm s carrying the spring catch 24 having been raised at the same time above the shoulder v of the stop 18 by the releasing action of the lever D, on its return engages said shoulder v, throwing stop 18 off the arm 20 of catch p, leaving it free to be released from the arm 16 of the operating arm G by the next releasing movement of the lever D which will close the shutter as shown by full lines in Fig. 1.

I do not confine myself to the ungearing and gearing device of the operating arm G described herein, neither do I confine myself to the use of the speed governor E, as neither are necessary to a successful operation of my improved photographic shutter. In cameras where dark slides are used the operating arm G may be moved to a set position at any time before the dark slide is withdrawn without ungearing said operating arm from the combined arbor and pinion h, so that the lever H and locking lever u may be left out of the construction. In cameras with fixed focus where the only obstacle between the sensitive film and the light is the shutter, the shutter disks may be closed before the operating arm is moved to a set position, and the shutter adjusted afterward to the exposures. The speed of the operating arm G may be regulated by the tension of the main spring instead of compressed air as there are only two speeds required in my improved shutter. It will be noticed by reference to the position of the shutter disks when closed as shown in Fig. 4, that the exposure of the sensitive film is not simultaneous with the releasing of the shutter mechanism but near the stopping thereof, which makes a revolution at each exposure. It is well understood that the releasing and stopping of any spring action produces a jar more or less to the parts thereof, but not when in motion.

Having thus described my invention what I claim is.

1. A photographic shutter mechanism comprising an outer case having lens cell openings on one side of its center bearing, a rotary shutter composed of disks mounted on separate arbors one fitted to turn within the other, each disk having an open space on one side of its center bearing and overlapping each other and held in contact laterally by spring pressure, a lever arm having a coupling connection with the inner shutter disk arbor for relatively adjusting said open spaces between the shutter disks for various times of exposures or closing the same and indicating each exposure from the front of the outer case, a spring actuated arm geared to the outer shutter disk arbor for operation, a lever arm pivoted to said spring actuated arm for throwing it out and in gear with said outer shutter disk arbor when said spring actuated arm is being moved to a set position, a lever for locking the shutter disks when ungeared from said spring actuated arm, spring detents and release catches engaging said spring actuated arm for detaining and releasing the same, a stop lock having an unlocking arm whereby one of the detents and catches may be released simultaneously or separately for time and instantaneous exposures, a compressed air oscillating speed governor geared to said spring actuated arm having an adjustable exhaust valve, a diaphragm or stop disk having various light apertures around its center bearing, means for setting, indicating and insuring the correct position of the diaphragm apertures over the lens openings from the front of the outer case, a finger and pneumatic releasing lever engaging the spring detents and release catches and shutter locking lever, substantially as and for the purpose specified.

2. In a photographic shutter mechanism, the combination with an outer case having lens cell openings, a rotary shutter composed of disks mounted on separate arbors one fitted to turn within the other each disk having an open space on one side of its center bearing and overlapping each other and held laterally in contact by spring pressure, means for relatively adjusting said open spaces between the shutter disks for various lengths of exposures and indicating the same from the front of the outer case, an actuator for actuating said rotary shutter, detents and releasing catches engaging said actuator, means for locking and unlocking one of said detents and release catches whereby said catches may be released separately or simultaneously by finger or pneumatic action for time and instantaneous exposures, means for regulating the speed of the actuator for actuating said rotary shutter mechanism, a diaphragm having various light apertures around its center bearing, means for setting, indicating and insuring the correct position of the same over the lens opening from the front of the outer case, substantially as specified.

3. In a photographic shutter mechanism, the combination with an outer case having lens cell openings, a rotary disk shutter having an adjustable exposure opening on one side of its center bearing, means for adjusting and indicating said exposure opening for various lengths of exposures from the front of the outer case, an actuator for actuating said rotary shutter engaging detents and release catches for detaining and releasing said actuator, means for locking and unlocking one of said detents and release catches whereby said catches and detents may be released separately or simultaneously from said actuator by finger or pneumatic action for time and instantaneous exposures, a compressed air oscillating speed governor having the partition 3, countersink or cup $i$, and valve $x$ and geared to the actuator for actuating said rotary shutter, a diaphragm provided with various light apertures around its center bearing, means for setting, and indicating the correct position of said apertures over the lens opening, substantially as set forth.

4. In a photographic shutter mechanism, the combination with an outer case having lens cell openings, a rotary shutter composed of disks mounted on separate arbors one fitted to turn within the other each disk having an open space on one side of its center bearing and overlapping each other and held laterally in contact by spring pressure, means for relatively adjusting said open spaces between the shutter disks for various lengths of exposures and indicating the same from the front of the outer case, an actuator for actuating said rotary shutter, detents and release catches engaging said actuator, means for locking and unlocking one of said detents and release catches whereby said detents may be released separately or simultaneously by finger or pneumatic action for time and instantaneous exposures, a diaphragm or stop disk having stop openings around its center bearing, means for setting and indicating the correct position of the several stop openings over the lens opening from the front of the outer case, substantially as specified.

GILBERT J. DICKSON.

Witnesses:
PAUL BAUER,
HUGH B. McLEAN.